(12) United States Patent
Groves

(10) Patent No.: US 8,172,248 B2
(45) Date of Patent: May 8, 2012

(54) TRAILER WITH ADJUSTABLE ELEVATION

(75) Inventor: William Mark Tarahina Groves, Murupara (NZ)

(73) Assignee: Ground Loading Trailers Limited, Tauranga (NZ)

( * ) Notice: Subject to any disclaimer, the term of this patent is extended or adjusted under 35 U.S.C. 154(b) by 73 days.

(21) Appl. No.: 12/308,386

(22) PCT Filed: Jun. 13, 2007

(86) PCT No.: PCT/NZ2007/000152
§ 371 (c)(1),
(2), (4) Date: Dec. 12, 2008

(87) PCT Pub. No.: WO2007/145537
PCT Pub. Date: Dec. 21, 2007

(65) Prior Publication Data
US 2010/0019469 A1   Jan. 28, 2010

(30) Foreign Application Priority Data
Jun. 13, 2006   (NZ) .................................. 547918

(51) Int. Cl.
*B60P 1/02* (2006.01)

(52) U.S. Cl. .................. 280/414.5; 280/490.1; 414/476; 414/481

(58) Field of Classification Search ............... 280/414.5, 280/475, 490.1; 414/476, 481, 482, 483
See application file for complete search history.

(56) References Cited

U.S. PATENT DOCUMENTS

| | | | | |
|---|---|---|---|---|
| 2,780,475 A | * | 2/1957 | Koerner | 280/414.5 |
| 2,806,710 A | * | 9/1957 | Mascaro | 280/414.5 |
| 3,346,131 A | * | 10/1967 | Lundell | 414/476 |
| 3,419,169 A | * | 12/1968 | Clayton | 414/481 |
| 3,700,254 A | * | 10/1972 | Eck | 280/63 |
| 3,837,665 A | * | 9/1974 | Schramm | 280/43.18 |
| 3,883,019 A | * | 5/1975 | Hansen, Jr. | 414/481 |

(Continued)

FOREIGN PATENT DOCUMENTS

AU    2001176109    8/2002

(Continued)

OTHER PUBLICATIONS

International Search Report for PCT/NZ2007/000152 mailed Oct. 29, 2007.
Australian Search Report mailed May 28, 2007.

*Primary Examiner* — Anne Marie M Boehler
(74) *Attorney, Agent, or Firm* — Nixon & Vanderhye P.C.

(57) ABSTRACT

A trailer having adjustable elevation is provided which includes a chassis 1 connected with a draw bar assembly 2 by a first linkage means, operating means 8 provided to raise or lower the chassis 1 relative to the draw bar assembly 2, second linkage means connecting pivotal wheel-mount assemblies 4 with the draw bar assembly 2 so that lowering and raising the chassis 1 provides a respective raising, and lowering of the wheel-mount assemblies 4 so that they can be retracted above the chassis 1, the first linkage means including a plurality of link arms 3 adapted to form a substantial parallelogram linkage, between the draw bar assembly 2 and the chassis 1, whereby the draw bar assembly 2 is permitted an arcuate range of motion relative to the chassis 1 while remaining substantially parallel therewith to enable the chassis to be engaged with the ground.

12 Claims, 11 Drawing Sheets

U.S. PATENT DOCUMENTS

| | | |
|---|---|---|
| 4,008,902 A | 2/1977 | Dill |
| 4,058,325 A | 11/1977 | Schramm |
| 4,326,594 A * | 4/1982 | Oka et al. ............... 172/328 |
| RE32,736 E * | 8/1988 | Lovell ............... 280/6.151 |
| 5,366,336 A * | 11/1994 | Friesen et al. ............... 414/476 |
| 6,135,700 A | 10/2000 | Collins |
| 6,592,139 B1 | 7/2003 | Shanahan |
| 7,219,915 B2 * | 5/2007 | Christensen ............... 280/490.1 |
| 2005/0067799 A1 | 3/2005 | Smith |
| 2005/0236806 A1 * | 10/2005 | Keiser ............... 280/402 |
| 2006/0175799 A1 * | 8/2006 | Heynssens ............... 280/414.5 |

FOREIGN PATENT DOCUMENTS

| | | |
|---|---|---|
| AU | 2005200640 | 8/2006 |
| EP | 198042 | 12/1987 |
| GB | 1466113 | 3/1977 |
| NZ | 242353 | 5/1996 |
| RU | 2048359 | 11/1995 |
| WO | 86/02326 | 4/1986 |
| WO | 03/059659 | 7/2003 |
| WO | 2004/069589 | 8/2004 |

* cited by examiner

TRAILER WITH ADJUSTABLE ELEVATION

This application is the U.S. national phase of International Application No. PCT/NZ2007/000152 filed 13 Jun. 2007 which designated the U.S. and claims priority to New Zealand Application No. 547918 filed 13 Jun. 2006, the entire contents of each of which are hereby incorporated by reference.

FIELD OF INVENTION

This invention relates to the field of vehicle trailers. In particular, the invention relates to a trailer which can be lowered to facilitate easy loading, then raised again for towage.

BACKGROUND

Trailers are commonly used to transport goods over long distances. The term "trailer" is used in this specification to mean any size or shape of container intended to be towed by a vehicle. The clearance required between the ground and the underside of the trailer chassis means the deck of the trailer is significantly elevated, making it difficult to load and unload the trailer with large and/or heavy items.

It is therefore common for trailers to have a pivot point about which the deck may be rotated to some degree, tilting the deck downwards towards the rear end to facilitate easier loading and unloading, while the trailer chassis may remain level and attached to the vehicle for stability. This solution is not ideal however, as the inclined deck of the trailer is not suitable for loading and/or unloading many items.

An improved solution to this problem would be to provide a mechanism whereby the deck of the trailer may be lowered relative to the wheels and parallel with the ground. Ideally, the mechanism should allow the underside of the chassis to be lowered to the extent that it rests on the ground, such that the trailer deck is substantially even with the ground. This would provide a very stable platform for loading, and items may be simply pushed or wheeled onto the deck with a hand trolley, wheelbarrow, dolly, or similar.

The main difficulty in designing such a mechanism is that the drawbar should remain attached to the tow-bar of the towing vehicle for stability while being lowered and elevated, and the wheels, axles, and suspension assemblies etc. of the trailer must be retracted above the underside of the chassis, while maintaining sufficient structural strength for the trailer to bear heavy loads.

The applicant is not aware of any trailers capable of sufficiently lowering the deck parallel with the ground to ground level while attached to an unmodified standard tow-bar on the towing vehicle.

U.S. Pat. No. 6,592,139 to Shanahan, for example, discloses an elevatable trailer having a telescopic frame or chassis, whereby retraction and extension of the frame causes wheel-mounting member to pivot such that wheels are raised and lowered, respectively, with respect to the frame. The drawbar is fixed relative to at least a portion of the frame, and is therefore lowered and raised with the frame. To maintain the trailer parallel with the ground, a modified tow-bar is required on the towing vehicle as shown in detail in FIG. 12 of Shanahan. Due to the design, the modified tow-bar offers little stability to support the trailer as it is lowered. Parallel lowering of the trailer is not possible when coupled with an unmodified tow-bar.

Australian Patent Application No. 2005200640 entitled 'Trailer' discloses a trailer having a drawbar pivotally attached to a support frame or chassis, and hydraulic cylinders acting between the draw bar assembly and each wheel support member. Retraction of the hydraulic cylinders causes both the wheel support members and the drawbar to pivot, lowering the chassis towards the ground. This solution is not ideal, however.

It is therefore an object of the invention to provide a trailer with a deck which can be easily lowered and elevated while attached to a towing vehicle and overcoming or ameliorating at least one disadvantage of the prior art, or at least to provide the public with a useful choice.

STATEMENTS OF INVENTION

According to one aspect of the present invention a trailer has a chassis connected with a draw bar assembly by a first linkage means, operating means provided to raise or lower the chassis relative to the draw bar assembly, ground engaging transporting means provided on either side of the chassis, second linkage means connecting a mounting of each transporting means with the assembly so that lowering and raising the chassis provides a respective raising and lowering of the transporting means so that they can be retracted above the trailer chassis, the first linkage means including a plurality of link arms adapted to form a substantially parallelogram linkage between the draw bar assembly and the chassis, whereby the draw bar assembly is permitted an arcuate range of motion relative to the chassis whilst remaining substantially parallel therewith to enable the chassis to be engaged with the ground.

According to a further aspect the invention can broadly be said to consist in a transport vehicle including:

a trailer chassis, having a front end, two sides, and a rear end;

a drawbar assembly with a tow-bar-receiving coupling at one end for attaching the trailer, in use, to the tow-bar of a vehicle;

a plurality of link arms, pivotally coupled at opposing ends to the drawbar assembly and the front end of the trailer chassis, forming a substantially parallelogram linkage therebetween such that the drawbar assembly is able to move through an arc substantially vertical relative to the chassis while remaining substantially parallel therewith;

at least one pair of wheel-mount assemblies pivotally mounted on opposing sides of the trailer chassis;

a wheel rotatably mounted or mountable to a respective wheel-mount assembly, rotatable in use about an axis offset from a pivot point of the wheel-mount assembly;

operating means provided between the drawbar assembly and trailer chassis, whereby the trailer chassis may be lowered and raised relative to the drawbar assembly and wheels; and at least one linkage means linking the wheel-mount assemblies of the trailer chassis to the drawbar assembly, such that the wheel-mount assemblies and wheels are pivoted about the pivot point and retracted above the underside of the trailer chassis when the chassis is lowered relative to the drawbar.

Preferably the link arms and/or linkage means are coupled with the drawbar assembly and chassis in pairs on opposing sides of the chassis and drawbar assembly.

Preferably the drawbar assembly is constructed substantially in the shape of an A-frame drawbar.

Preferably a locking means is provided between the drawbar assembly and trailer chassis to secure the trailer in a raised travel position.

Preferably the locking means comprises a locking pin to secure the chassis and wheel-mount assemblies in place.

Preferably the locking pin may be withdrawn by a solenoid, allowing the trailer chassis to be lowered.

Preferably the operating means consists of a bi-directional hydraulic ram.

Alternatively, the operating means may consist of any other bi-directional force-amplification mechanism, such as a mechanical lever and ratchet system, worm drive, winch, or the like.

Possibly the wheel-mount assemblies each include an independent suspension assembly.

Preferably the wheel-mount assemblies each include a mudguard.

Preferably the wheels are rotatably mounted to the wheel-mount assemblies by way of a stub axle.

Preferably one or more hydraulic stabilizer rams are mounted to the chassis or drawbar assembly, whereby in use the stabilizer rams may be lowered to support the front end of the trailer.

Preferably a section of the deck is tapered downward towards the rear end of the chassis to assist loading and unloading of the trailer.

According to a further aspect, the invention can broadly be said to consist in a kitset of parts for upgrading an existing trailer having a chassis and drawbar assembly to a trailer having adjustable elevation, including:

a plurality of link arms for pivotal coupling at opposing ends to the drawbar assembly and chassis of the trailer to form a substantially parallelogram linkage therebetween such that the drawbar assembly is able to move through an arc substantially vertical relative to the chassis while remaining substantially parallel therewith;

at least one pair of wheel-mount assemblies for pivotal mounting on opposing sides of the trailer chassis, upon which wheels may be mounted with a stub axle;

operating means to be provided between the drawbar assembly and trailer chassis, whereby the trailer chassis may be lowered and raised relative to the drawbar assembly and wheels; and at least one linkage means for linking the wheel-mount assemblies to the drawbar assembly, such that the wheel-mount assemblies are pivoted and retracted above the underside of the trailer chassis when the chassis is lowered relative to the drawbar.

Preferably each wheel-mount assembly includes an independent suspension assembly.

According to a further aspect the invention consists in a trailer substantially as herein described with reference to FIGS. 1 and 2, FIGS. 3 to 6, or FIGS. 7 to 11 of the accompanying drawings.

According to a further aspect the invention consists in a kitset of parts substantially as herein described with reference to FIGS. 1 and 2, FIGS. 3 to 6, or FIGS. 7 to 11 of the accompanying drawings.

Further aspects of the invention, which should be considered in all its novel aspects, will become apparent from the following description, given by way of example, and with reference to the accompanying drawings.

BRIEF DESCRIPTION OF FIGURES

The invention will now be described by example only with reference to the figures where.

DETAILED DESCRIPTION

Figure 1:
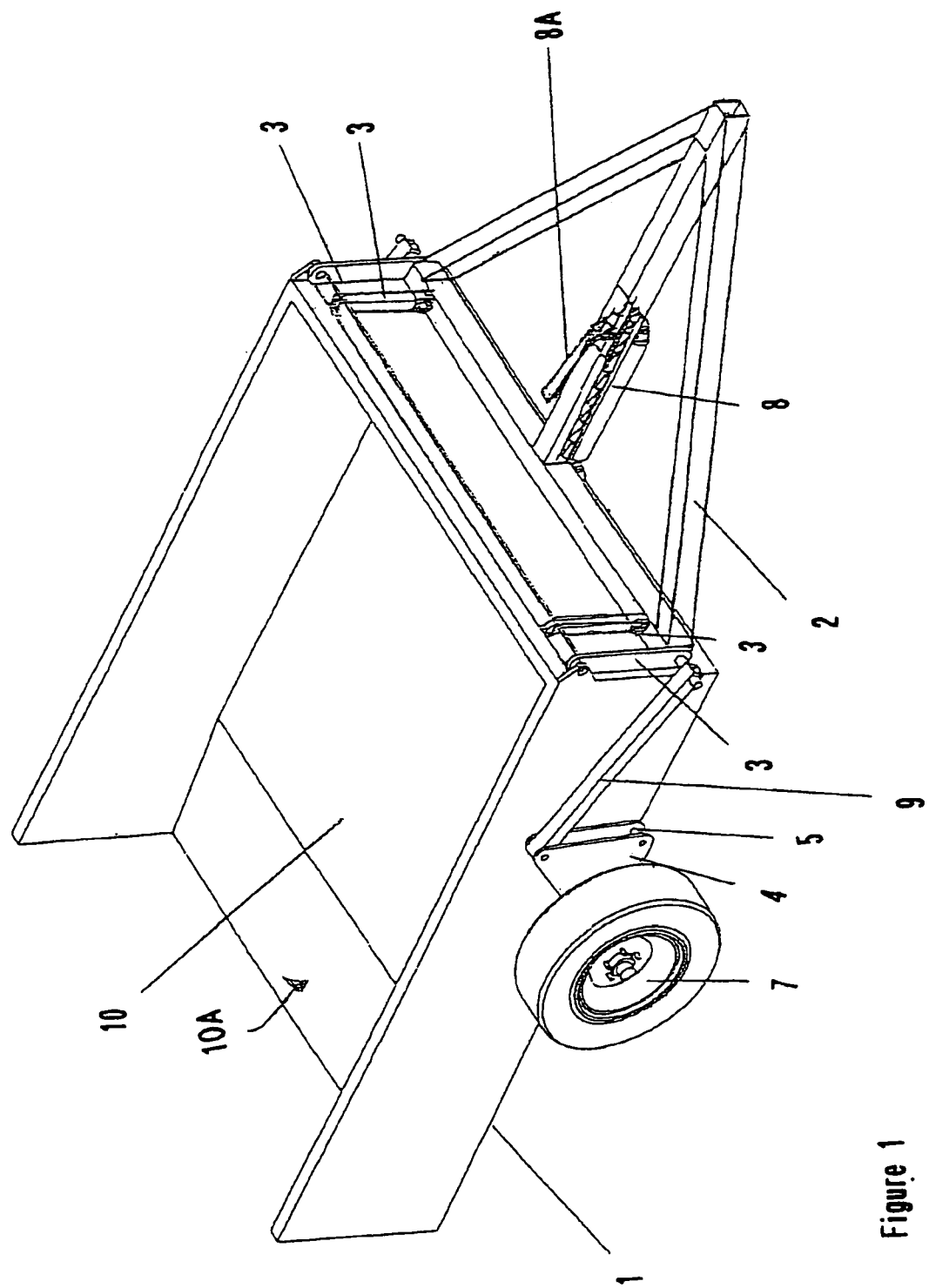
FIG. 1: Is an isometric view of a first embodiment of the invention.

The invention is described below by way of example. Throughout the description, like reference numerals will be used to refer to like features in different embodiments.

Referring to FIG. 1, a wheeled transport vehicle is shown according to a first embodiment of the invention. In this embodiment, the invention consists in a two-wheeled vehicle to be towed by a powered vehicle for transporting goods. The trailer is shown in the raised position. Although "wheels" are shown in each of the embodiments it is to be appreciated that other ground engaging means such as tracks could be used alternatively and this term is to have this wider meaning whenever used in this specification.

A trailer chassis 1 is coupled to a drawbar assembly 2 by way of a number of link arms 3. The drawbar assembly 2 is in turn coupled to two wheel-mount assemblies 4 on either side of the chassis 1 by two mechanical linkages 9. A wheel 7 is mounted on each wheel-mount assembly 4 and rotatable about an axis offset from the wheel-mount pivot point 5.

Figure 2:
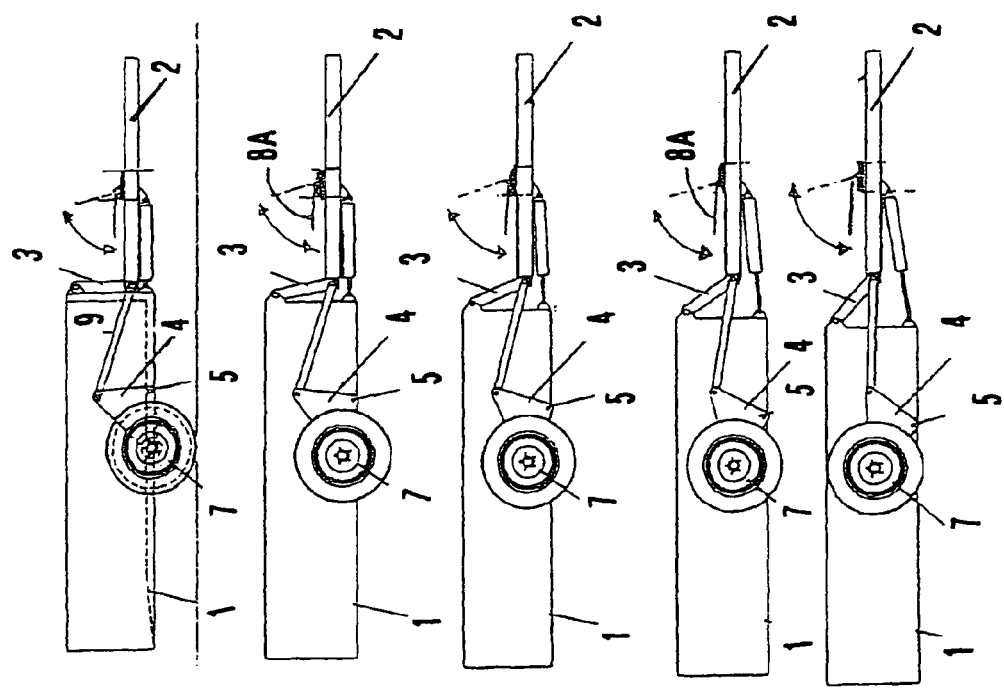
FIG. 2: Is a series of side projections of the embodiment shown in FIG. 1, illustrating lowering of the trailer chassis.

Referring now to FIG. 2, a series of side projections of the same embodiment of the invention shows the trailer in the raised and lowered positions, and three intermediate positions therebetween. An operating mechanism 8, in this embodiment shown as including a hand-operated mechanical ratchet lever 8A in conjunction with a hydraulic ram, is mounted to the drawbar assembly 2 and chassis 1. Alternatively, the mechanism 8 may comprise any suitable mechanism which will be apparent to an engineer skilled in this area of technology, such as an electric motor or hand-operated worm-drive cylinder, hydraulic cylinder, or winch. Operation of the lever imparts a force between the drawbar assembly 2 and chassis 1 such that the drawbar assembly 2 is forced in an arc away from and upwards relative to the chassis 1 by the link arms 3. At the same time, the mechanical linkage 9 causes the wheel-mount assemblies 4 to pivot about the pivot point 5, such that the wheel 7 moves upward in an arc about the pivot point 5.

The affect of this is to decrease the clearance between ground and the chassis 1, while the drawbar remains substantially horizontal at a substantially constant height. As a result, the trailer may remain coupled to a standard tow-bar of a towing vehicle as it is lowered. Once the wheels 7 are completely withdrawn above the underside of the chassis 1, the chassis comes to rest on the ground in the fully lowered position, facilitating easy loading and/or unloading of goods on and/or off the deck 10 of the trailer. A section of the deck 10, referenced 10A, may be tapered downwardly towards the rear end of the chassis, so that a hand trolley, wheelbarrow, dolly, or similar can easily be wheeled onto the deck 10

Operation of the mechanism 8 to impart a force in the opposing direction has the reverse effect; the link arms 3 force the chassis 1 in an upwards arc towards the drawbar assembly 2, while the mechanical linkage 9 causes the wheel-mount assemblies 4 to pivot and the wheels 7 to lower in an arc about the pivot point 5, increasing the clearance between the ground and the chassis 1 until the trailer reaches the raised position, or travel mode.

Figure 3:
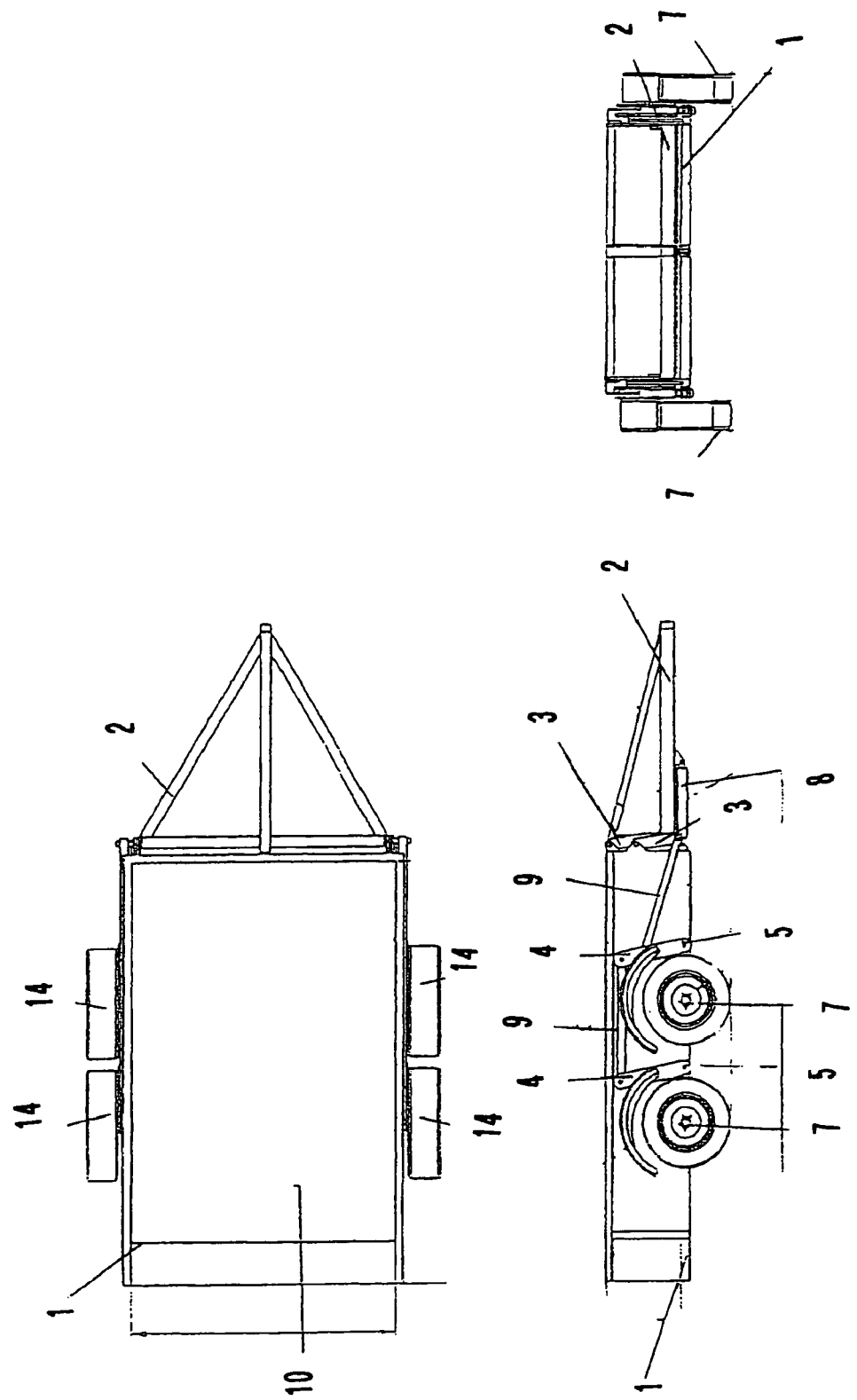
FIG. 3: Is a third angle projection of a further embodiment of the invention.

Referring now to FIG. 3, a wheeled transport vehicle according to a further embodiment of the invention is shown in the raised position. In this embodiment, the invention consists in a four-wheeled vehicle to be towed by a powered vehicle for transporting goods.

In this embodiment, the operating means to impart a bi-directional force between the drawbar assembly and the chassis may include a double-acting hydraulic cylinder 8. Preferably the hydraulic cylinder is operated by means of an electric pump, or alternatively a hand-operated lever may be used to pump the pressurized fluid of the hydraulic cylinder. Again other alternative mechanisms or arrangements will be apparent to engineers skilled in this area. It will be appreciated, however, that this embodiment is intended to bear heavier loads, and an electric pump and hydraulic cylinder is therefore preferred.

The embodiment in this figure has four wheel-mount assemblies 4, and four wheels 7. A mudguard 14 may be attached to each of the wheel-mount assemblies 4 substantially above the wheels 7. The mechanical linkage 9 on each side of the chassis couples the wheel-mount assemblies 4 to the drawbar assembly 2, which in turn is coupled to the chassis 1 by four link arms 3.

Figure 4:
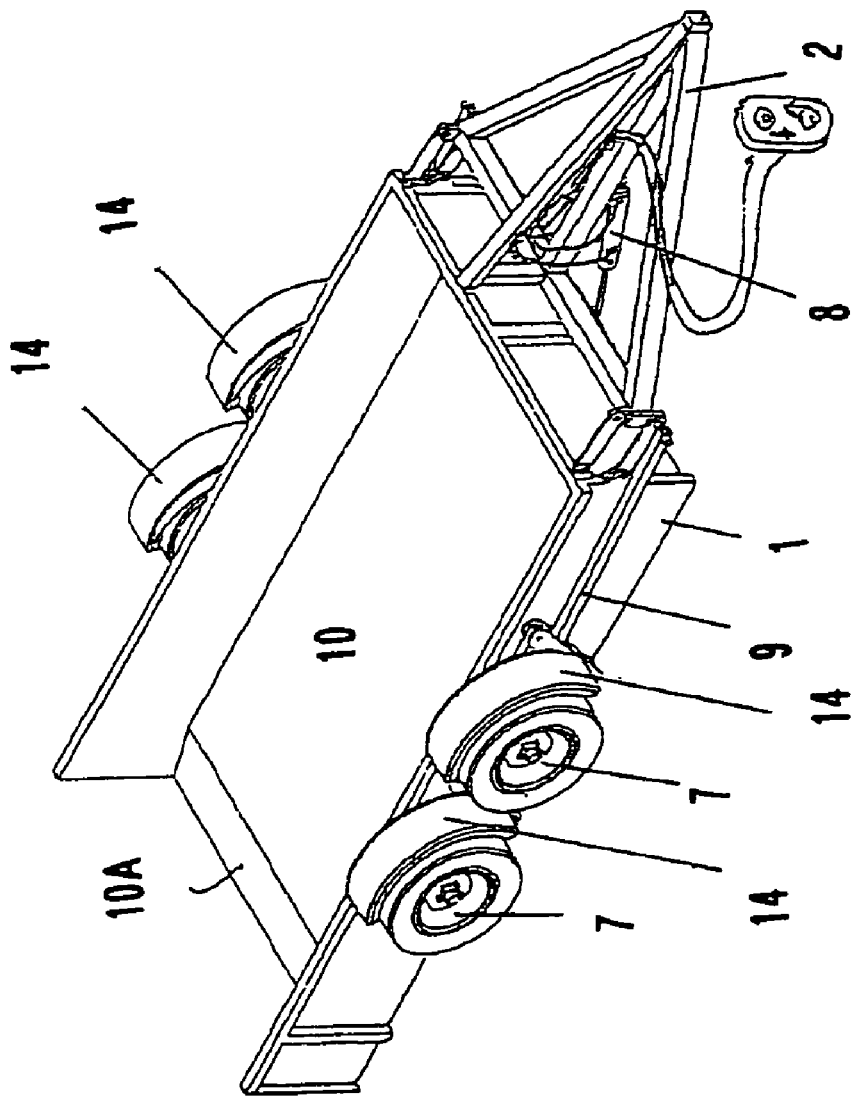
FIG. 4: Is an isometric view of the embodiment shown in FIG. 3 with the chassis in the lowered position.

The same embodiment is shown in an isometric view in FIG. 4. This view shows the trailer in the lowered position, with the ram of the hydraulic cylinder 8 fully extended, and the wheels 7 retracted above the underside of the chassis 1.

Figure 5:
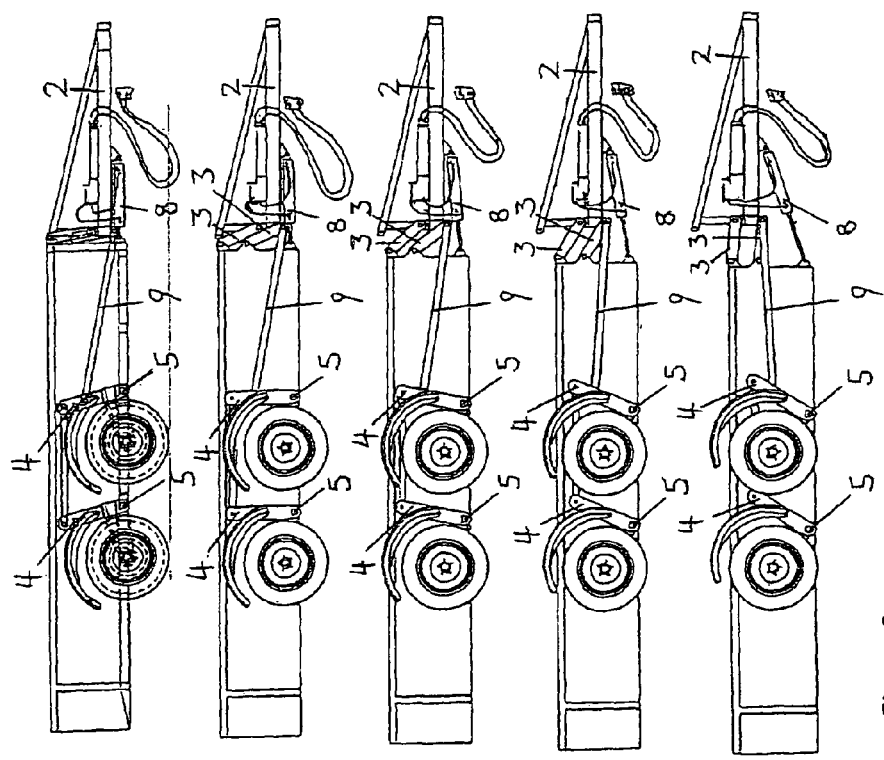
FIG. 5: Is a series of side projections of the embodiment shown in FIGS. 3 and 4, illustrating lowering of the trailer chassis.

Referring now to FIG. 5, the same embodiment of the invention is shown in the fully raised and lowered positions, and three intermediate positions therebetween. The trailer is initially shown in the raised position or travel mode, and may be lowered by operation of a hydraulic cylinder 8 or an alternative mechanism or arrangement. Extension of the hydraulic cylinder's ram forces the chassis 1 away from the drawbar assembly 2 in a downward arc. The movement of mechanical linkage 9 between the chassis 1 and drawbar assembly 2 causes the wheel-mount assemblies to pivot about the pivot point 5, retracting the wheels 7 in an upward arc until the chassis 1 rests on the ground.

Figure 6:
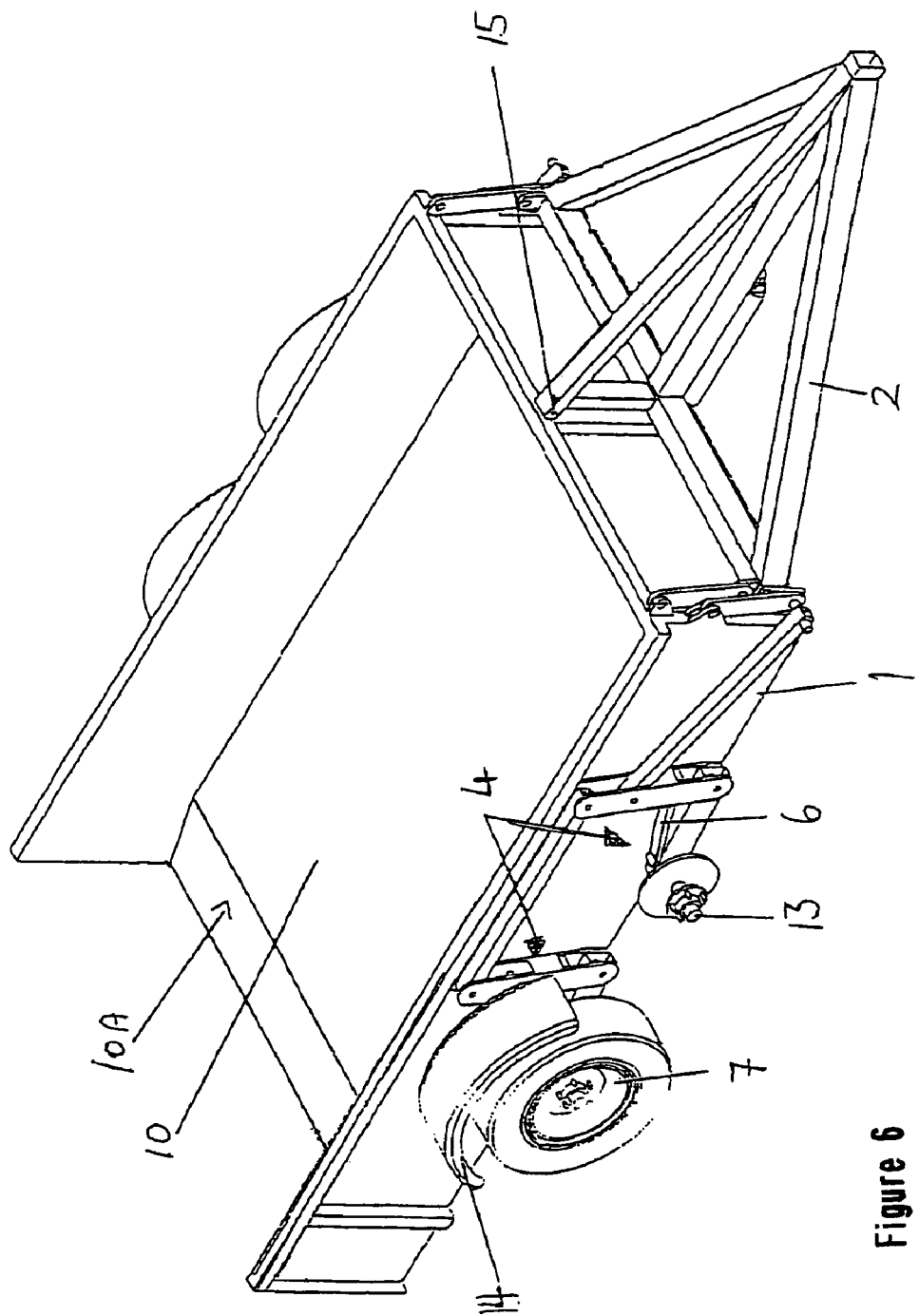
FIG. 6: Is an isometric view of the embodiment shown in FIGS. 3 to 5.

Referring now to FIG. 6, a further isometric view of the embodiment of FIGS. 3-5 is shown, with one of the wheels 7 and mudguards 14 has been removed to show the wheel-mount assembly 4, including a stub axle 13 and suspension assembly 6. FIG. 6 also shows the locking pin 15, which can be used to secure the wheel-mount and drawbar assemblies to the chassis in travel mode to prevent inadvertent lowering of the chassis during transport. The locking pin 15 may be removed manually, or remotely using a switch and solenoid for example, to allow the trailer chassis to be lowered.

For support when not coupled with a towing vehicle, the trailer may also have one or more hydraulic stabilizer rams trailer jacks or the like attached to the chassis or drawbar assembly to support the front end of the trailer when extended. If the stabilizer rams are attached to the chassis, it is envisioned that the rams would be adapted to automatically retract and extend as the trailer is lowered and raised, respectively, stabilizing the trailer during operation to improve stability and safety when not coupled with a towing vehicle.

Figure 7:
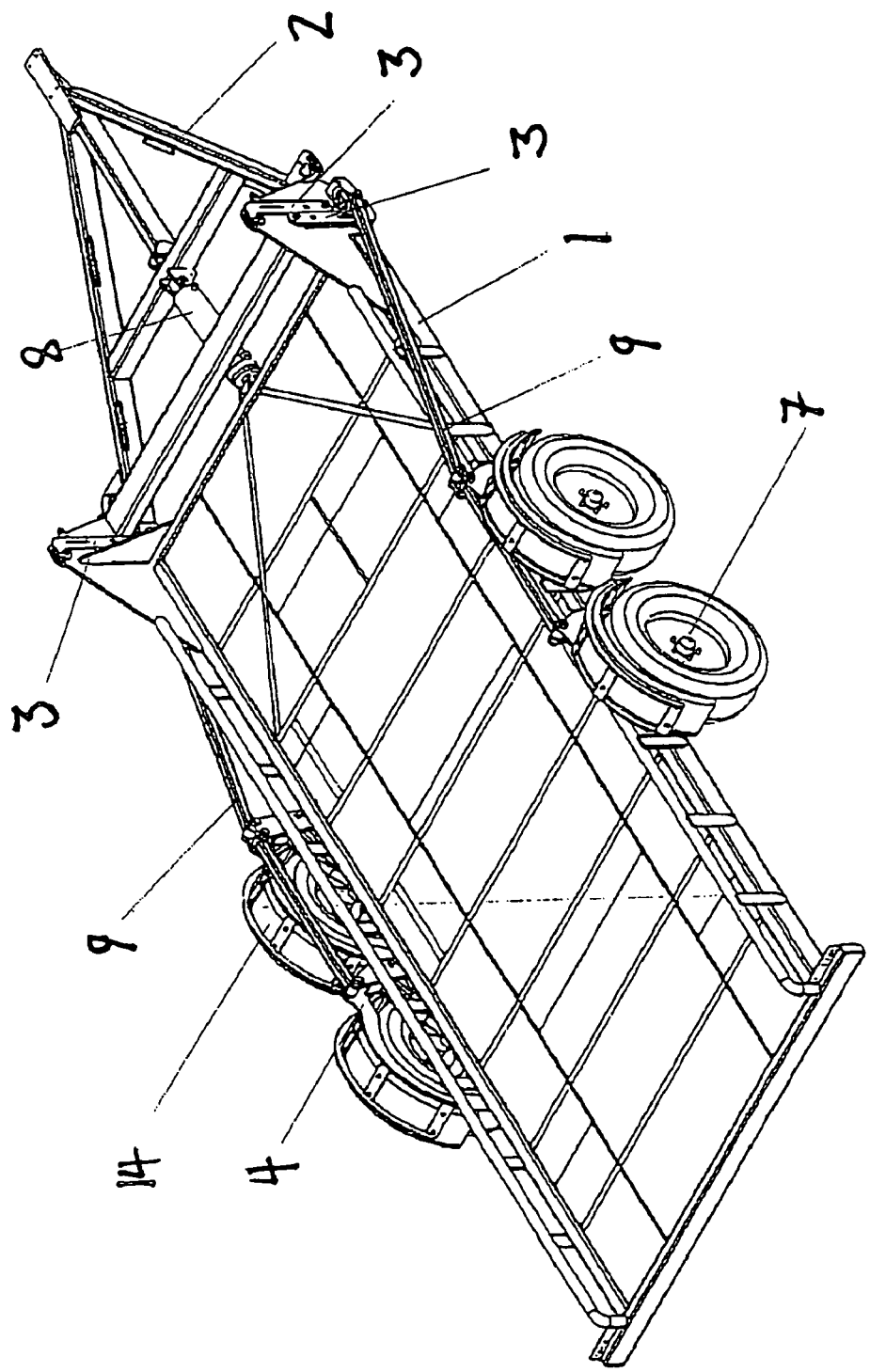
FIG. 7: Is an isometric view of a preferred embodiment of the invention, shown in the raised position.
Figure 8:
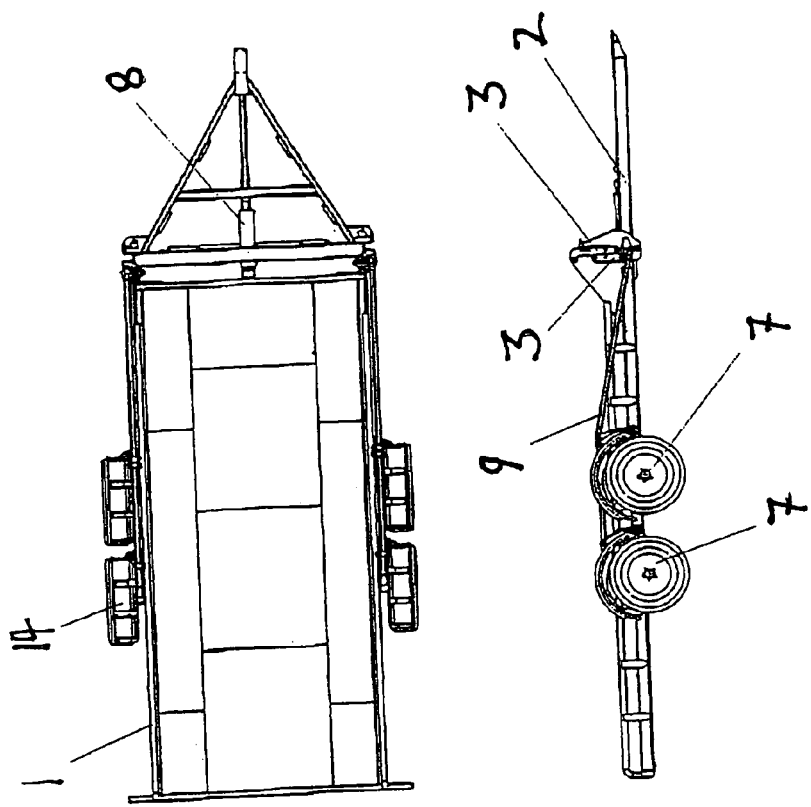
FIG. 8: Is a third angle projection of the embodiment shown in FIG. 7.
Figure 8:
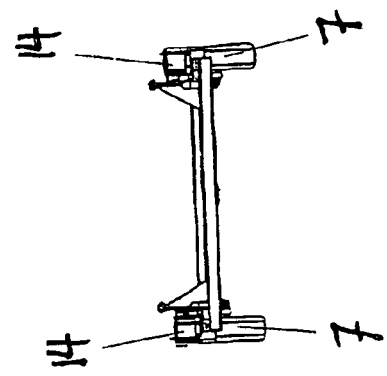
Figure 9:
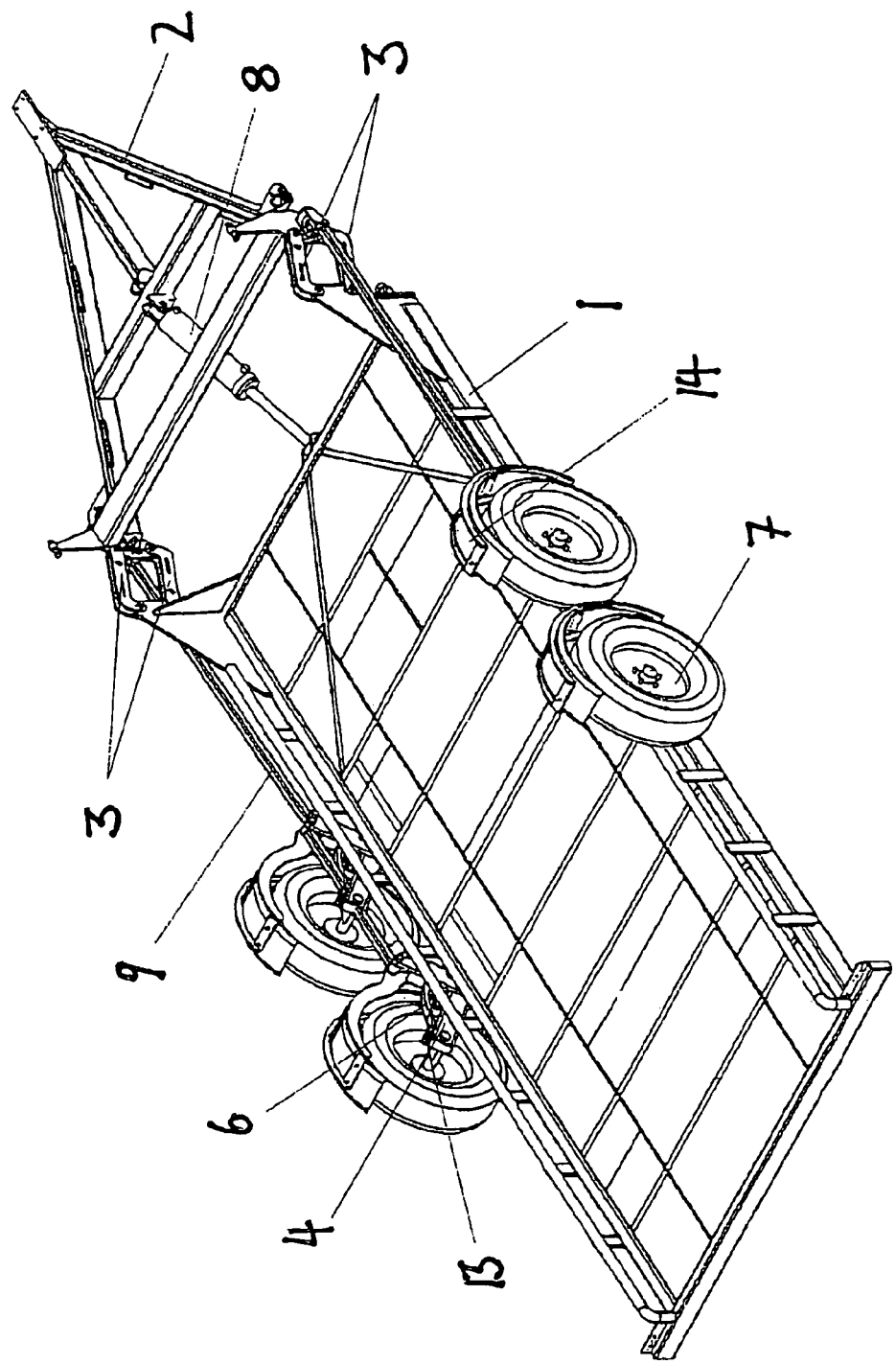
FIG. 9: Is an isometric view of the embodiment of FIGS. 7 and 8, shown in the lowered position.
Figure 10:
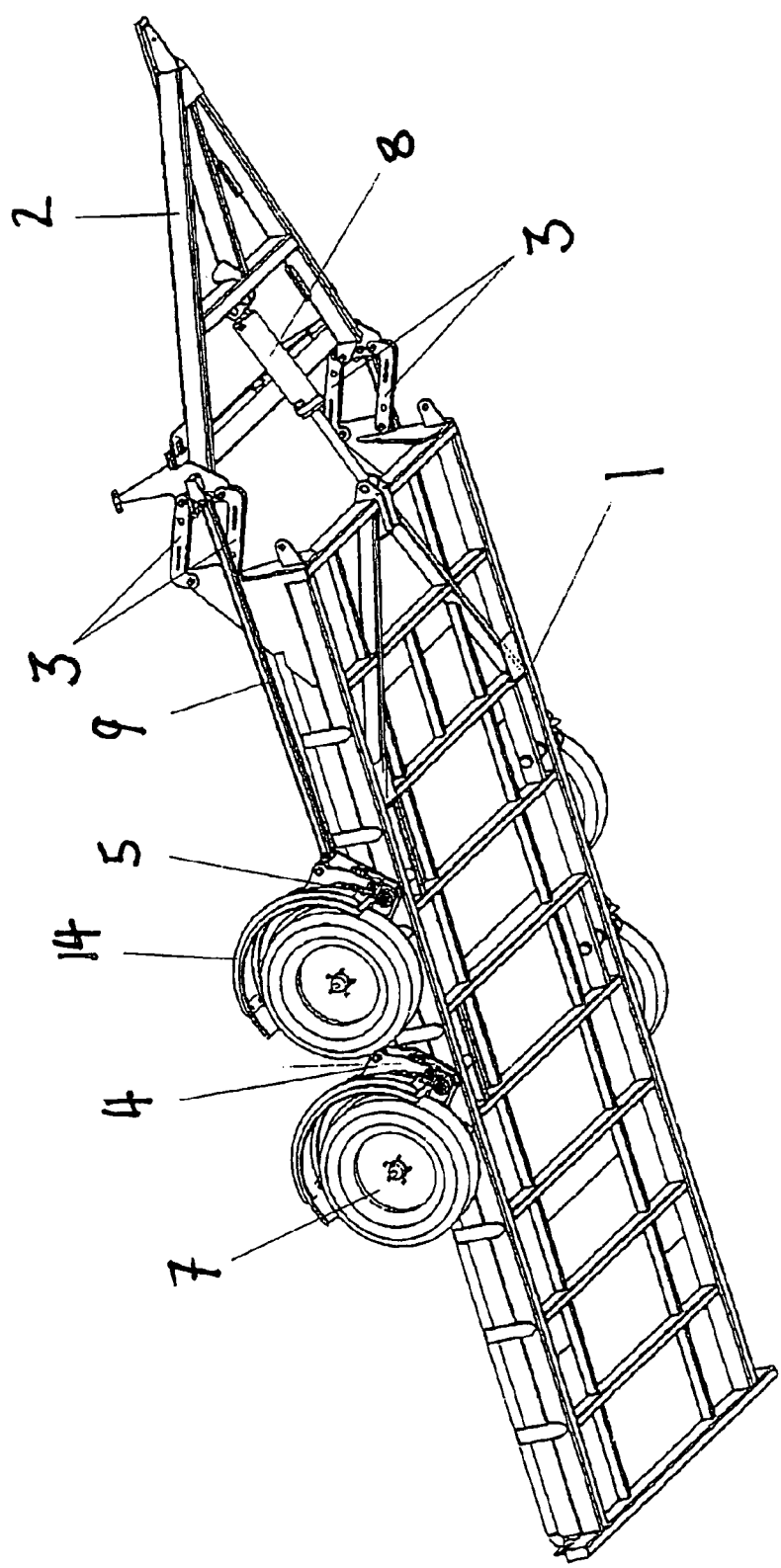
FIG. 10: Is an isometric view of the underside of the embodiment shown in FIGS. 7-9, shown in the lowered position.
Figure 11:
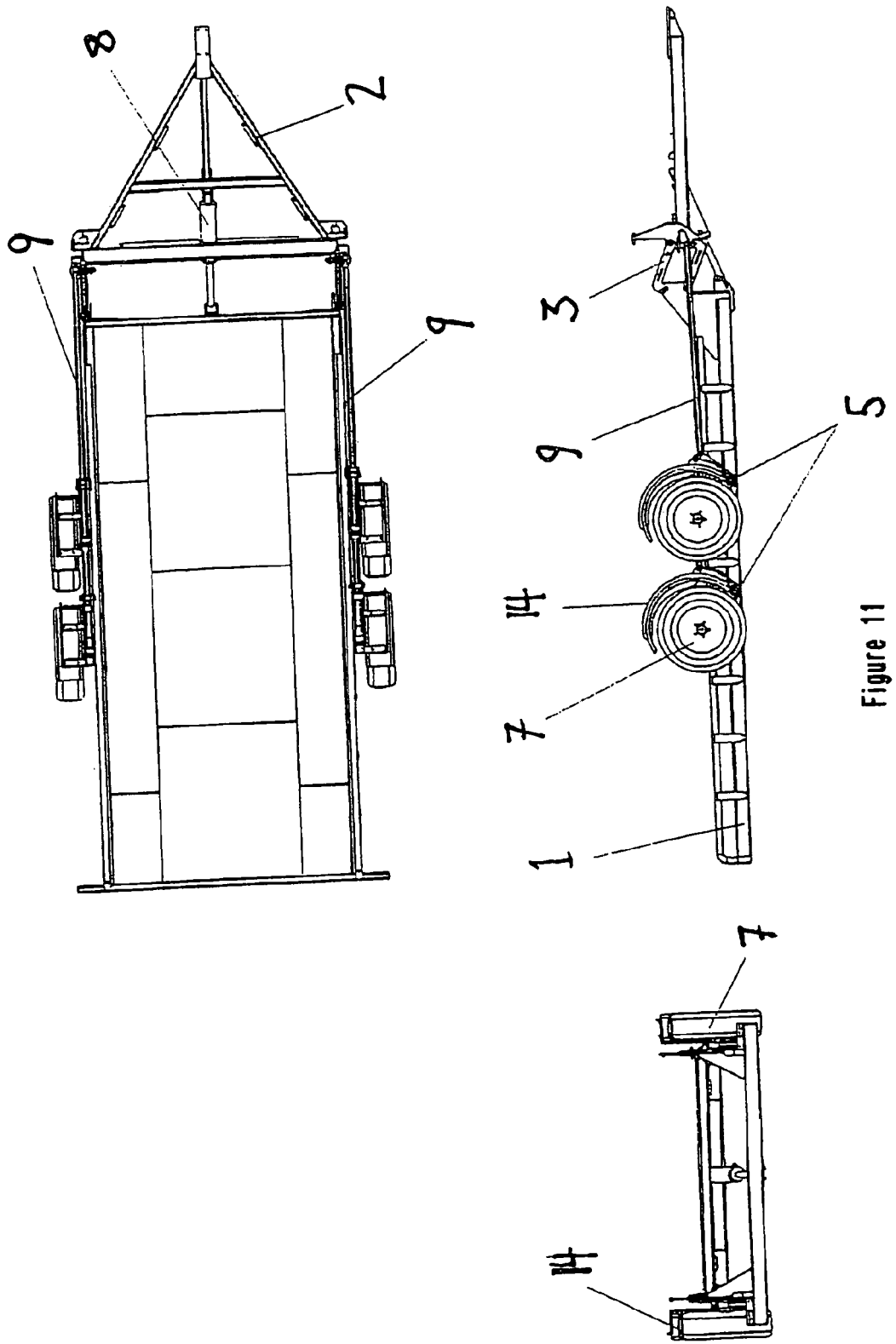
FIG. 11: Is a third angle projection of the embodiment of FIGS. 7-10, shown in the lowered position.

The preferred embodiment of the invention is shown in a raised position in FIGS. 7-8 and in a lowered position in FIGS. 9-11. As can be seen from the figures, the link arms 3 are arranged in a pairs on opposing sides of the trailer, forming a pair of parallelogram linkages between the chassis 1 and draw bar 2. As shown in the Figures, the pivotal couplings of respective link arm pairs are displaced substantially vertically from each other on each of the chassis and the drawbar. That is, the link arms or link arm pairs pivot about pairs of substantially horizontal axes on the chassis and the drawbar, respectively, and those axes are vertically spaced such that the drawbar is permitted an arcuate range of movement about the front end of the chassis. In other words, the drawbar and chassis form substantially vertical links in the parallelogram linkage, and those links remain substantially vertical throughout the arcuate range of motion of the draw bar assembly. The parallelogram linkage allows the draw bar assembly 2 to be dislocated from the chassis 1 and moved away in a substantially upwards arc using the operating mechanism 8. Displacement of the draw bar assembly 2 in this way causes the wheel-mount assemblies 4 to pivot upwardly. In use, the chassis 1 is lowered to the ground while the draw bar remains a substantially constant distance from the ground, until the wheels 7 are fully retracted with the chassis resting on the ground as shown in FIGS. 9-11. Both the draw bar assembly 2 and chassis 1 remain substantially parallel to the ground as the chassis 1 is lowered and/or raised.

Although the invention has been described with respect to a trailer of transport vehicle, it will be appreciated by those skilled in the art that the invention may also be provided by way of a kitset of parts for upgrading an existing trailer. The kitset would typically include a plurality of link arms 3 to form a parallelogram linkage between the drawbar 2 and chassis 1 of the existing trailer, at least one pair of wheel-mount assemblies 4, operating means 8 for lowering and raising the chassis of the trailer and a linkage means for linking the wheel-mount assemblies to the drawbar assembly.

From the foregoing, it will be seen that an elevatable trailer is provided which offers the capability of being lowered to facilitate loading and raised to a travel mode while bearing potentially heavy loads for transportation. The trailer may be coupled to any standard or non-standard tow-bar of a towing vehicle and remains substantially parallel with the ground during operation.

Although the invention has been described by way of example, it should be appreciated that variations and modifications may be made without departing from the scope of the invention. Furthermore, where known equivalents exist to specific features, such equivalents are incorporated as if specifically referred in this specification.

The word "comprise" and variations such as "comprises" or "comprising" when used in the specification is intended to be interpreted herein in an inclusive sense rather than an exclusive sense, i.e. as meaning "including but not limited to".

Any discussion of the prior art throughout the specification should in no way be considered as an admission that such prior art is widely known or forms part of the common general knowledge in the field in any country.

The invention claimed is:

1. A trailer comprising a chassis connected with a draw bar assembly by a first linkage, an operating mechanism having opposing ends pivotally mounted to the draw bar assembly and the chassis whereby extension and retraction of the operating mechanism causes a respective lowering and raising of the chassis relative to the draw bar assembly, wheel-mount assemblies provided on either side of the chassis, a second linkage connecting each wheel-mount assembly with the draw bar assembly so that said lowering and raising the chassis provides a respective raising and lowering of the wheel-mount assemblies, the first linkage comprising a plurality of link arms forming a parallelogram linkage between the draw bar assembly and the chassis, the drawbar assembly and chassis forming substantially vertical links of the parallelogram linkage, whereby the draw bar assembly is permitted a substantially vertical arcuate range of motion relative to the chassis whilst remaining substantially parallel therewith to enable the chassis to be engaged with the ground.

2. A trailer as claimed in claim 1, wherein the link arms are coupled with the drawbar assembly and chassis in pairs on opposing sides of the chassis and drawbar assembly.

3. A trailer as claimed in claim 1 further comprising a locking pin adapted to secure the trailer in a raised travel position.

4. A trailer as claimed in claim 1 further comprising one or more hydraulic stabilizer rams mounted to the chassis or drawbar assembly, whereby in use the stabilizer rams may be lowered to support the front end of the trailer.

5. A transport vehicle comprising:
  a trailer chassis, comprising a front end, two sides, and a rear end;
  a drawbar assembly comprising a tow-bar-receiving coupling at one end for attaching the trailer, in use, to the tow-bar of a vehicle;
  a plurality of link arms, pivotally coupled at opposing ends to the drawbar assembly and the front end of the trailer chassis, forming a parallelogram linkage therebetween wherein the drawbar assembly and chassis form substantially vertical links of the parallelogram linkage such that the drawbar assembly is able to move through an arc substantially vertical relative to the chassis while remaining substantially parallel therewith;
  at least one pair of wheel-mount assemblies pivotally mounted on opposing sides of the trailer chassis;
  a wheel rotatably mounted or mountable to a respective wheel-mount assembly, rotatable in use about an axis offset from a pivot point of the wheel-mount assembly;
  an operating mechanism pivotally mounted at opposing ends to the drawbar assembly and the trailer chassis, whereby extension and retraction of the operating mechanism causes a respective lowering and raising of the trailer chassis relative to the drawbar assembly and wheels; and
  at least one mechanical linkage linking the wheel-mount assemblies of the trailer chassis to the drawbar assembly, such that the wheel-mount assemblies and wheels are pivoted about the pivot point and retracted above the underside of the trailer chassis when the chassis is lowered relative to the drawbar assembly.

6. A transport vehicle as claimed in claim 5, wherein the link arms and linkage are coupled with the drawbar assembly and chassis in pairs on opposing sides of the chassis and drawbar assembly.

7. A transport vehicle as claimed in claim 5, wherein the drawbar assembly is constructed substantially in the shape of an A-frame drawbar.

8. A transport vehicle as claimed in claim 5 further comprising a locking pin adapted to secure the drawbar assembly against the trailer chassis to secure the trailer in a raised travel position.

9. A transport vehicle as claimed in claim 8, wherein the locking pin may be withdrawn by a solenoid to allow the trailer chassis to be lowered.

10. A transport vehicle as claimed in claim 5, wherein the operating mechanism comprises a bi-directional hydraulic ram.

11. A transport vehicle as claimed in claim 5 further comprising including one or more hydraulic stabilizer rams mounted to the chassis or drawbar assembly, whereby in use the stabilizer rams may be lowered to support the front end of the trailer.

12. A transport vehicle as claimed in claim 5, wherein a section of the deck is tapered downward towards the rear end of the chassis to assist loading and unloading of the trailer.

* * * * *